L. C. HUCK.
LAWN TRIMMER.
APPLICATION FILED JULY 29, 1914.

1,127,764.

Patented Feb. 9, 1915.
2 SHEETS—SHEET 1.

Witnesses

Inventor
L. C. Huck,

L. C. HUCK.
LAWN TRIMMER.
APPLICATION FILED JULY 29, 1914.

1,127,764.

Patented Feb. 9, 1915.
2 SHEETS—SHEET 2.

Witnesses

Inventor
L. C. Huck,
By ............ Attorney

UNITED STATES PATENT OFFICE.

LOUIS C. HUCK, OF HOLDREGE, NEBRASKA.

LAWN-TRIMMER.

1,127,764.

Specification of Letters Patent.

Patented Feb. 9, 1915.

Application filed July 29, 1914. Serial No. 853,373.

*To all whom it may concern:*

Be it known that I, LOUIS C. HUCK, a citizen of the United States, residing at Holdrege, in the county of Phelps and State of Nebraska, have invented certain new and useful Improvements in Lawn-Trimmers; and I do hereby declare the following to be a full, clear, and exact description of the invention, such as will enable others skilled in the art to which it appertains to make and use the same.

This invention relates to lawn trimmers, and one of the principal objects of the invention is to provide a device of simple construction which can be attached to an ordinary lawn mower or which can be used separately and which will trim the lawn at the sides of the walk, and which will form a small gutter so that the water will run off the walk.

Another object of the invention is to provide a lawn trimmer comprising an axle having a down-turned end, to which is attached a stub axle connected to a sleeve formed on the down-turned end of the axle, said cutter being mounted on a stub axle and held between collars which are interchangeable to give different adjustments to the cutter.

Figure 1:
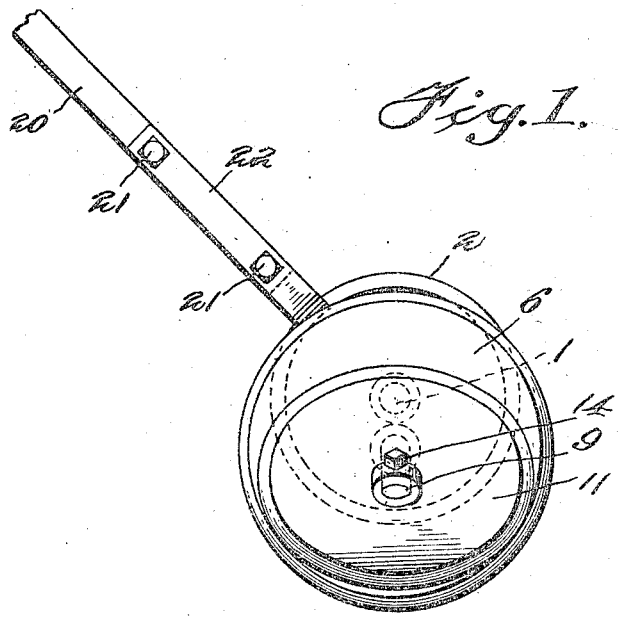
Figure 2:
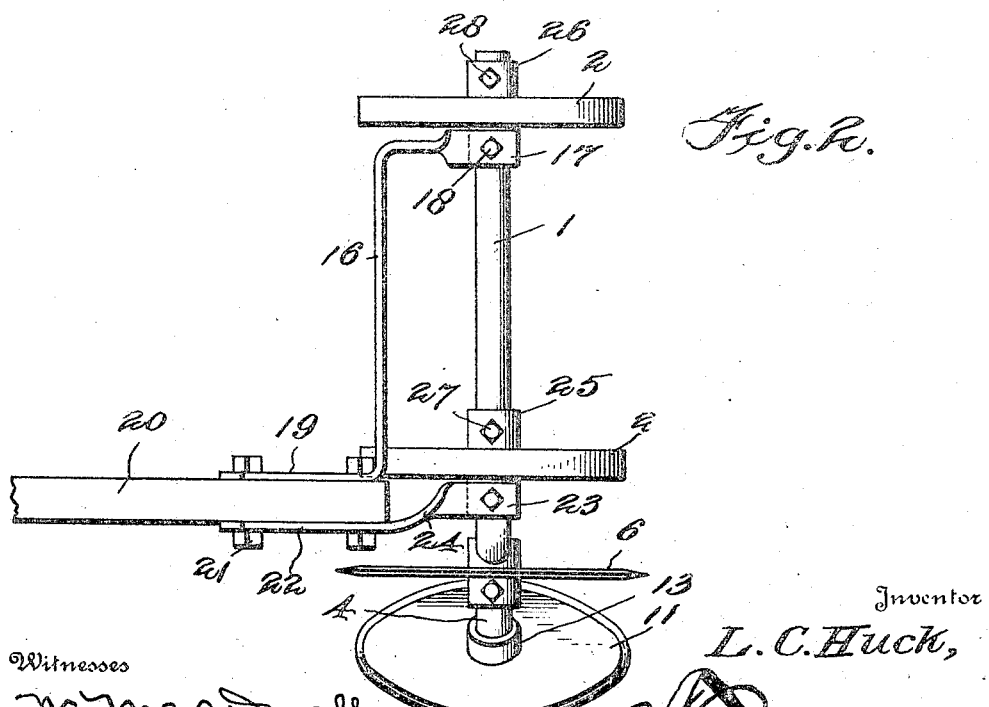
Figure 3:
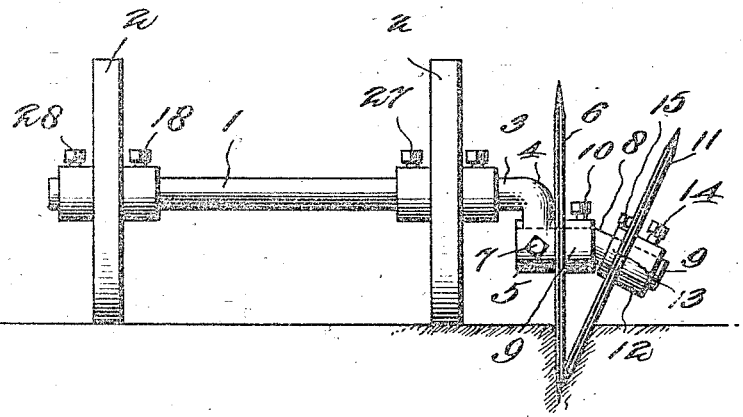
Figure 4:
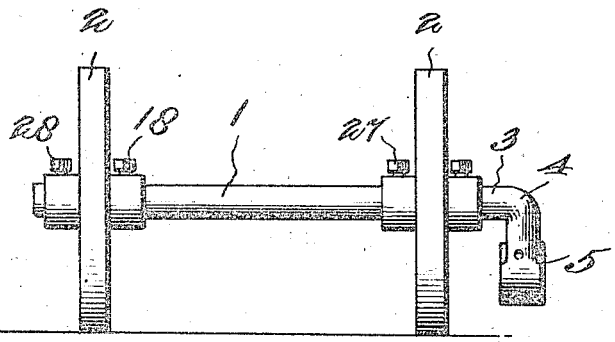

These and other objects may be attained by means of the construction illustrated in the accompanying drawings, in which, Figure 1 is a side elevation of a lawn trimmer made in accordance with this invention, Fig. 2 is a top plan view of the same, Fig. 3 is a front elevation, and Fig. 4 is a front elevation with the cutter and guide wheel removed.

Referring to the drawing, the numeral 1 designates an axle, and 2 are the ground wheels on which the device is supported. The axle 1 has an extended end 3 which is curved at 4 and extended downward, said down-turned end being provided with a bearing sleeve 5. A rotary guide and cutter 6 is mounted on a stub axle connected to the sleeve 5 by a set screw 7 and held onto a stub shaft 8 by a collar 9 and set screw 10. The stub axle 8 is provided with an angular branch 9, and journaled on the angular branch 9 is the inclined cutter 11. The revolving cutter 11 and the guide cutter 6 are of disk form, and the cutter 11 is held on the portion 9 of the stub shaft 8 by means of suitable collars 12 and 13 upon opposite sides of the disk. The collars 12 and 13 are of different widths and when interchanged, one for the other, the cutter 11 is held at different distances from the cutter 6 upon the branch portion 9 of the stub shaft. The collar 12 is provided with a set screw 14, and the narrower collar is provided with a set screw 15.

A brace 16 is connected to the axle 1 by a collar 17 and a set screw 18, said brace extending transversely parallel with the axle and provided with an angular foot 19 secured to a handle 20 by suitable bolts 21. The bolts 21 also serve to hold a brace 22 which is connected to the axle 1 by means of a collar 23, and said brace is twisted at 24 so that the foot 19 and the brace 22 will lie parallel one upon each side of the handle 20. Collars 25 and 26 are connected to the axle 1 by means of set screws 27 and 28.

The operation of the device may be briefly described as follows: The disk or wheel cutter 6 is positioned at the side of the walk, and the angle of the cutter 11 is adjusted to cut a small V-shaped portion out of the sod to form a small gutter. The axle 1 may be used as the axle of the lawn mower, or the device may be used independently of the lawn mower.

Various changes may be made in the details of construction without departing from the spirit and scope of the invention as defined in the claims.

What is claimed is:—

1. A lawn trimmer comprising an axle having a down-turned end provided with a sleeve, a stub axle mounted in said sleeve and provided with an angular branch, a vertical guide cutter mounted on the stub axle, and an inclined cutter mounted upon the angular branch of the stub axle, and means for adjusting the cutters one relatively to the other.

2. A lawn trimmer comprising an axle mounted on wheels, said axle having a down-turned end provided with a sleeve, a stub axle mounted in said sleeve and provided with an angular end, a cutter mounted on said angular end, and collars of different widths connected to the opposite sides of said cutter and interchangeable to adjust the cutters one relatively to the other.

3. A lawn trimmer comprising an axle, a sleeve connected to the outer end of said axle, a stub shaft mounted in said sleeve, a guide cutter mounted on said stub shaft, and an angular cutter mounted on said stub shaft, and provided with means for adjusting one cutter relatively to the other.

In testimony whereof I affix my signature in presence of two witnesses.

LOUIS C. HUCK.

Witnesses:
CHARLES J. BACKMAN,
A. J. SHAFER.